(12) United States Patent
Kruper, Jr. et al.

(10) Patent No.: US 8,324,288 B2
(45) Date of Patent: Dec. 4, 2012

(54) EXTRUDED POLYMER FOAMS CONTAINING BROMINATED FATTY ACID-BASED FLAME RETARDANT ADDITIVES

(75) Inventors: William J. Kruper, Jr., Sanford, MI (US); David R. Arrowsmith, Achern (DE); Duane R. Romer, Midland, MI (US); Bruce M. Bell, Higgins Lake, MI (US); William G. Stobby, Midland, MI (US); Inken Beulich, Buehl Bw (DE); Zenon Lysenko, Midland, MI (US); John Gordon-Duffy, La Wantzenau (FR); Chau V. Vo, Souffelweyersheim (FR)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/307,728

(22) Filed: Nov. 30, 2011

(65) Prior Publication Data

US 2012/0077894 A1    Mar. 29, 2012

Related U.S. Application Data

(62) Division of application No. 12/247,818, filed on Oct. 8, 2008, now Pat. No. 8,080,592.

(60) Provisional application No. 61/001,579, filed on Nov. 2, 2007.

(51) Int. Cl.
*C08J 9/06* (2006.01)
(52) U.S. Cl. .................... 521/79; 82/88; 82/97; 82/142; 82/146; 82/147
(58) Field of Classification Search .................... 521/79, 521/82, 88, 97, 146, 142, 147
See application file for complete search history.

(56) References Cited

U.S. PATENT DOCUMENTS

| 3,359,220 A | 12/1967 | Wright |
| 5,171,757 A | 12/1992 | Stobby |
| 5,171,915 A | 12/1992 | Forbus |

FOREIGN PATENT DOCUMENTS

WO    2008/021418 A    2/2008

*Primary Examiner* — Irina S Zemel
(74) *Attorney, Agent, or Firm* — Gary C Cohn PLLC

(57) ABSTRACT

Extruded polymer foams are prepared using brominated fatty acids, an ester, amide or ester-amide of a brominated fatty acid, a glyceride of one or more brominated fatty acids, or a polymerized brominated fatty acid as an FR additive. The brominated FR additives unexpectedly are stable at the extrusion temperatures, and provide excellent flame retardancy to the foams.

7 Claims, No Drawings

EXTRUDED POLYMER FOAMS CONTAINING BROMINATED FATTY ACID-BASED FLAME RETARDANT ADDITIVES

CROSS-REFERENCE TO RELATED APPLICATION

This application is a divisional of application Ser. No. 12/247,818, filed 8 Oct. 2008, now U.S. Pat. No. 8,080,592. This application claims benefit of U.S. Provisional Patent Application 61/001,579, filed 2 Nov. 2007.

The present invention relates to extruded polymer foams, such as expanded stryrenic polymers and copolymers, which contain flame retardant agents based on a brominated fatty acid.

Flame retardant (FR) additives are commonly added to extruded polymer foam products that are used in construction and automotive applications. The presence of the FR additive allows the foam to pass standard fire tests, as are required in various jurisdictions. Various low molecular weight (<~1000 g/mol) brominated compounds are used as FR additives in these foam products. Many of these, such as hexabromocyclododecane, are under regulatory and public pressure that may lead to restrictions on their use, and so there is an incentive to find a replacement for them.

An alternative FR additive for extruded polymer foams should be capable of allowing the foam to pass standard fire tests, when incorporated into the foam at reasonably low levels. Because extruded foams are processed at elevated temperatures, it is important that the FR additive is thermally stable at the temperature conditions used in the extrusion process. For some foams, such as polystyrene and styrene copolymer foams, these temperatures are often 180° C. or higher. Several problems are encountered if the FR additive decomposes during the extrusion process. These include loss of FR agent and therefore loss of FR properties, and the generation of decomposition products (such as HBr) that are often corrosive and therefore potentially dangerous to humans and harmful to operating equipment. The FR agent should not cause a significant loss of desirable physical properties in the polymer. It is preferable that the FR additive has low toxicity and is not highly bioavailable.

Brominated vegetable oils have been described in U.S. Pat. No. 3,359,220 as FR additives for use in bead foam applications. As described in U.S. Pat. No. 3,359,220, the brominated vegetable oil is added into a suspension polymerization process, and is in that manner incorporated into polymer particles which are then expanded by contact with steam. The polymer particles are a polystyrene that is copolymerized with tung oil. The brominated vegetable oils are described in U.S. Pat. No. 3,359,220 as decomposing in the temperature range of 140-180° C. The bead foam process does not require high processing temperatures, as the polymerization and expansion steps are conducted at temperatures of only up to about 115° C. These steps are conducted at temperatures well below the reported decomposition temperature of the brominated vegetable oil, and so the decomposition of the brominated vegetable oils is not a problem with their use in polystyrene bead foam applications.

The present invention is a process comprising forming a pressurized mixture of (A) a combustible polymer, (B) a flame retarding amount of at least one brominated fatty acid, an ester, amide or ester-amide of a brominated fatty acid, a glyceride of one or more brominated fatty acids, a polymerized brominated fatty acid, or a mixture of any two or more of the foregoing, and (C) a blowing agent, and extruding the mixture into a region of reduced pressure such that the mixture expands and cools to form an expanded polymer containing component (B). For convenience, brominated fatty acids, esters, amides or ester-amides of brominated fatty acids, glycerides of one or more brominated fatty acids, and polymerized brominated fatty acids, as well as mixtures of two or more thereof, are sometimes referred to herein as BFAB (brominated fatty acid-based) FR additives.

In another aspect, the invention is an extruded combustible polymer foam, having a density of from 1 to about 30 lb/ft$^3$ (16-480 kg/m$^3$), the extruded combustible polymer foam containing a flame retarding amount of a brominated fatty acid, an ester, amide or ester-amide of a brominated fatty acid, a glyceride of one or more brominated fatty acids, a polymerized brominated fatty acid, or a mixture of any two or more of the foregoing.

In another aspect, the invention is an extruded polystyrene or styrene copolymer foam having a density of from 1 to about 30 lb/ft$^3$ (16-480 kg/m$^3$), the expanded polystyrene or styrene copolymer foam containing a flame retarding amount of a brominated fatty acid, an ester, amide or ester-amide of a brominated fatty acid, a glyceride of one or more brominated fatty acids, a polymerized brominated fatty acid, or a mixture of any two or more of the foregoing.

In certain preferred embodiments of the invention, the process is conducted in the presence of a melt flow promoter such as is described in more detail below. The presence of the melt flow promoter in effective amounts has been found to very significantly reduce the amount of the BFAB FR additive that is needed to pass standardized fire tests. Therefore, in another aspect, the invention is an expanded combustible polymer containing a flame retarding amount of a BFAB FR additive and a melt flow promoter. In this aspect, the combustible polymer is preferably polystyrene or a styrene copolymer.

Surprisingly, extruded foam made in accordance with the invention exhibits excellent FR properties, as indicated by various standard tests. Even though the mixture of polymer and the BFAB are exposed to temperatures well in excess of the decomposition temperatures that are reported in U.S. Pat. No. 3,359,220 for the brominated vegetable oil, it has been found that little or no thermal degradation of the BFAB occurs during the extrusion process. Therefore, the BFAB FR additive is not consumed or degraded during the foam manufacturing process. The BFAB FR additives are often effective at surprisingly small levels, especially when used in conjunction with a melt flow promoter. The BFAB FR additives can be up to twice as effective, on the basis of the weight of bromine in the extruded polymer foam, as hexabromododecane, especially when used in conjunction with the melt flow promoter. Many of the BFAB FR additives are readily available materials that are inexpensive and have GRAS (generally recognized as safe) status.

In certain embodiments, the extruded foam is made using water or carbon dioxide (or both) as all of or part of the blowing agent. Surprisingly, the BFAB FR additives have been found to be stable under the extrusion conditions, even in the presence of water and/or carbon dioxide, both of which are capable of engaging in hydrolysis reactions with esters and brominated aliphatic compounds. No significant loss of molecular weight by the BFAB FR additive is seen when water and/or carbon dioxide are present as a blowing agent in the extrusion process.

Yet another advantage of the invention is that excellent FR properties can be achieved even when the extruded foam does not contain a tin stabilizer compound.

In this invention, brominated fatty acids, esters, amides, ester-amides or glycerides of brominated fatty acids, and polymerized brominated fatty acids, ("BFAB FR additives") are useful FR additives for expanded organic polymers. The BFAB FR additive suitably contains at least about 15% by weight bromine. The BFAB FR additive may contain at least 20%, at least 25%, at least 35% or at least 40% by weight bromine. The BFAB FR additive may contain up to 65%, up to 60%, or up to 55% by weight bromine. The BFAB FR additive may have a number average molecular weight of 500 or more, preferably 750 or more, and even more preferably 1000 or more.

Useful brominated fatty acids contain from 12 to 30, especially from 12 to 20 carbon atoms. A useful brominated fatty acid may contain from 1 to 8 bromine atoms, provided that it contains at least 15% by weight bromine. A useful brominated fatty acid may contain other inert substituents, such as hydroxyl groups. Hydroxyl groups can be present on the fatty acid starting material, or sometimes can be introduced by hydrolysis of a pendant bromine atom during the manufacturing process. The brominated fatty acid may contain other inert substituents.

As used herein, a substituent is considered to be "inert" if it contains one or more heteroatom-containing groups that do not adversely affect the function of the material as an FR additive in the extruded polymer foam. The function can be adversely affected, for example, if the group causes the material to become incompatible with the organic polymer, if the group causes the material to react in an undesirable way with the organic polymer, if the group causes the material to decompose at too low of a temperature, of if the group causes the material to become ineffective as an FR additive under standard fire test conditions. Examples of inert substituents include, for example, hydroxyl, ether, ester, carboxylic acids, urethane, urea, biuret, isocyanurate, ketone, aldehyde, amino, amide, fluorine, chlorine and the like.

Useful esters of brominated fatty acids include those which correspond to the reaction product of a brominated fatty acid as described above with a monoalcohol or a compound having multiple hydroxyl groups (other than glycerine). Similarly, useful amides of brominated fatty acids include those which correspond to the reaction product of a brominated fatty acid with a compound having one or more primary or secondary amino groups. Useful ester-amides of brominated fatty acid include those which correspond to the reaction product of a brominated fatty acid with an aminoalcohol having at least one amino group and at least one hydroxyl group. In this context, the term "corresponding to" a reaction product means that the structure of the ester, amide, or amide-ester is that which would be obtained by reacting the brominated fatty acid with an alcohol, amine or aminoalcohol, as the case may be, although in practice a different synthesis method may be used to produce the material. The ester, amide or ester-amide of the brominated fatty acid may contain one, two, three, four or more fatty acid chains, at least one of which is brominated. The ester, amide or ester-amide will contain at least 15% by weight bromine.

Certain useful esters of brominated fatty acids include those represented by structure I:

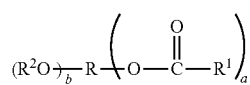
(I)

In structure I, R is an unsubstituted or inertly substituted hydrocarbyl group and each $R^1$ independently represents a brominated linear aliphatic group containing from 11 to 23 carbon atoms. $R^1$ may contain from 1 to 8 or more bromine atoms. In structure I, each —$OR^2$ is independently a hydroxyl group or an unsubstituted or inertly substituted ether or ester group which does not contain bromine, in each case being bonded to the adjacent R group through an oxygen atom. When the —$OR^2$ group is an ester, it may be the residue of a fatty acid group having from 12 to 24 carbon atoms. In structure I, a is at least one, and b is zero or a positive number. a and/or b can be large numbers when the ester is polymeric in nature. a and b are such that the fatty acid ester contains at least 15% by weight bromine. a is preferably from 1 to 4 and b is preferably from 0 to 3.

Certain useful amides of brominated fatty acids include those represented by structure II:

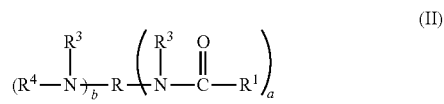
(II)

In structure II, R, $R^1$, a and b are as described with respect to structure I. Each $R^3$ is independently hydrogen, unsubstituted or inertly substituted alkyl, or unsubstituted or inertly substituted aryl. In structure II, each —$NR^3R^4$ is a group which does not contain bromine. Each —$NR^3R^4$ group is independently (I) a primary amino group (in which case $R^3$ and $R^4$ are both hydrogen), (II) a secondary amino group (in which case $R^3$ is hydrogen and $R^4$ is unsubstituted or inertly substituted alkyl, or unsubstituted or inertly substituted aryl), (III) a tertiary amino group (in which case both $R^3$ and $R^4$ are unsubstituted or inertly substituted alkyl, or unsubstituted or inertly substituted aryl), or (IV) an unsubstituted or inertly substituted amide group, (in which case $R^3$ is hydrogen, unsubstituted or inertly substituted alkyl, or unsubstituted or inertly substituted aryl and $R^4$ is —$(O)CR^6$, where $R^6$ is unsubstituted or inertly substituted alkyl, or unsubstituted or inertly substituted aryl. The $R^4$ group may be the residue (after removal of the carboxyl —OH) of a fatty acid having from 12 to 24 carbon atoms. In structure I, a is at least one, and b is zero or a positive number. a and b are such that the fatty acid amide contains at least 15% by weight bromine. a is preferably from 1 to 4 and b is preferably from 0 to 3.

Certain useful ester-amides of brominated fatty acids include those represented by structure III:

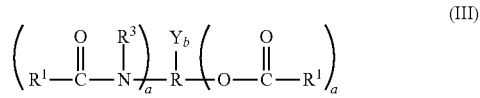
(III)

wherein R, $R^1$, $R^3$, a and b are as defined above with regard to structures I and II, and each Y represents an —$OR^2$ group or an —$NR^3R^4$ group, with the —$OR^2$ group and the —$NR^3R^4$ group being as defined above with regard to structure I and II, respectively. Each a is preferably from 1 to 4 and b is preferably from 0 to 3.

Glycerides of brominated fatty acids are of particular interest, because of their somewhat high molecular weights (especially when the glyceride is a di- or triglyceride) and because these materials can be prepared easily from certain inexpensive vegetable oils and animal fats. The glycerides may contain one, two or three brominated fatty acid groups. If the glyceride contains only one or two brominated fatty acid groups, it may correspondingly contain one or two free hydroxyls (on the glycerine portion of the molecule), and/or may be substituted with one or two non-brominated fatty acid groups. Various positional isomers can exist when the glyceride contains only one or two brominated fatty acid groups. Any of these positional isomers is suitable. Glyceride compounds containing one brominated fatty acid group can exist in the form of two positional isomers as represented by structures IV:

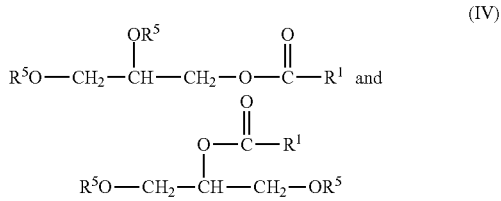

wherein $R^1$ is a described before and $R^5$ is hydrogen or the residue of a nonbrominated fatty acid group. Similarly, glyceride compounds containing two brominated fatty acid groups can exist in the form of two positional isomers as represented by structures V:

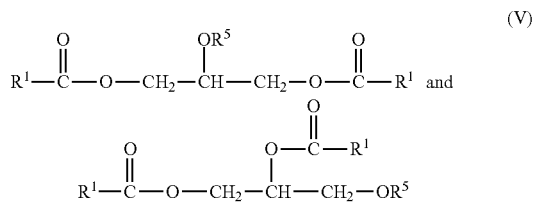

wherein $R^1$ and $R^5$ are as described before. Glyceride compounds containing three brominated fatty acid groups can be represented by structure VI:

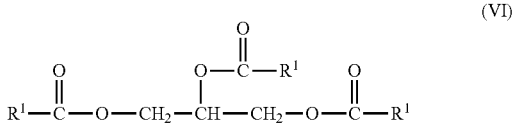

wherein $R^1$ again is as described before.

Mixtures of glycerides corresponding to structures IV and V, IV and VI, V and VI and IV, V and VI are all useful herein.

Polymerized brominated fatty acids can also be used. The average degree of polymerization may be as little as 1.1 to 50 or more, with an average degree of polymerization of about 1.5 to 5 being generally preferred. These materials can be prepared, for example, by (1) polymerizing a hydroxyl-containing, unsaturated fatty acid, followed by bromination, (2) brominating a hydroxyl-containing fatty acid, followed by polymerization or (3) introducing hydroxyl groups onto a brominated fatty acid, followed by polymerization. Methods for polymerizing hydroxyl-containing fatty acids are described, for example, in GB 1 469 531 and GB 1 373 660. The brominated fatty acid can also be polymerized by reaction with a chain extender or other coupling agent, to introduce, for example, acetal, urethane or similar linkages between brominated fatty acid molecules. As before, this type of polymerization reaction can be performed before or after brominating.

An FR additive of particular interest herein is a brominated vegetable oil or animal fat. These materials typically contain high proportions of triglycerides, and often contain in addition quantities of free fatty acids, monoglycerides, diglycerides or some mixture of two or more thereof. All of the fatty acid groups may contain one or more bromine atoms, but usually some proportion of the fatty acid groups are not brominated. The brominated vegetable oil or animal fat preferably contains from 25 to 65% by weight bromine. Preferred brominated oils include, for example, brominated soybean oil, brominated safflower oil, brominated cotton oil, brominated linseed oil, brominated peanut oil, brominated olive oil, brominated sunflower oil, brominated canola oil, brominated rapeseed oil, brominated corn oil, brominated castor oil, brominated palm oil, brominated hemp oil, or combinations of any two or more thereof. More preferably, the brominated oil is a brominated soybean oil, brominated sunflower oil, brominated canola oil, brominated linseed oil, brominated corn oil, brominated rapeseed oil, or a combination of any two or more thereof. The vegetable oil may be obtained from a genetically modified organism, such as genetically modified soybean, sunflower or canola. The vegetable oil or animal fat may contain cis- and/or trans-carbon-carbon double bonds. Either or both types of double bonds may be brominated. Vegetable oils or animal fats that have been treated to transform cis-double bonds to trans-double bonds can be used, as can fatty acids, esters, amides, ester-amides and fatty acid polymers that have been treated in that way (or made from a vegetable oil or animal fat so treated). Methods for accomplishing this transformation are described, for example, by Snyder et al., *J. Am. Oil Chem. Soc.* 1982, 59 (11), 469-470.

Surprisingly, the BFAB FR additives usually have excellent thermal stability, as determined by a 5% weight loss temperature analysis. The 5% weight loss temperature is measured by thermogravimetric analysis as follows: ~10 milligrams of the BFAB FR additive are analyzed using a TA Instruments model Hi-Res TGA 2950 or equivalent device, with a 60 milliliters per minute (mL/min) flow of gaseous nitrogen and a heating rate of 10° C./min over a range of from room temperature (nominally 25° C.) to 600° C. The mass lost by the sample is monitored during the heating step, and the temperature at which the sample has lost 5% of its initial weight is designated the 5% weight loss temperature (5% WLT). This method provides a temperature at which a sample has undergone a cumulative weight loss of 5 wt %, based on initial sample weight. The BFAB FR additive preferably exhibits a 5% WLT of at least the temperature at which the combustible polymer is melt-processed, either to blend it with the BFAB FR additive or to process the blend into an article such as a foam, extruded part, molded part, or the like. The 5% WLT of the BFAB FR additive is often in excess of 200° C., preferably in excess of 220° C. and even more preferably in excess of 240° C. The 5% WLT of brominated sunflower oil is approximately 273° C. (depending somewhat on the extent of bromination) and that of hexabrominated stearic acid is about 246° C.

Brominated glycerides of fatty acids, such as brominated vegetable oils and animal fats, can be made by directly brominating a vegetable oil or animal fat that contains at least some unsaturated constituent fatty acids. This is conveniently done in a solvent using a source of elemental bromine as the brominating agent. The solvent is one which is not reactive with the fatty acid and which does not engage in free-radical reactions with the bromine source or bromine. Suitable solvents include, for example, carbon tetrachloride, methylene chloride, and n-heptane. Suitable brominating conditions are well-known and described, for example, in McCutcheon,

*Org. Synth.* Vol. 3, E. C. Horning, Ed., John Wiley and Sons, Inc. London 1955, pp. 526-528. Brominated fatty acids can be prepared by hydrolysis of the brominated vegetable oil or animal fat, or by brominating the corresponding fatty acid. Other esters, amides and ester-amides of fatty acids can be made by forming the ester or amide by reaction of an alcohol (or polyalcohol), primary or secondary amine compound or aminoalcohol with the corresponding fatty acid, vegetable oil or animal fat, followed by brominating. The bromination can be instead performed on the starting fatty acid, vegetable oil or animal fat.

All or some portion of the unsaturation sites may be brominated. If the starting oil or fat contains saturated constituent fatty acids, the brominated product will contain corresponding non-brominated constituent fatty acids. Some brominated vegetable oils are commercially available. Those commercially available brominated vegetable oils can be used herein.

Brominated fatty acids can be prepared by hydrolyzing the brominated vegetable oil or animal fat, or by brominating the fatty acid. Esters, amides and ester-amides can be made in analogous fashion, either by converting the brominated vegetable oil or animal fat to the ester, amide or ester-amide (by reaction with an alcohol, amine or aminoalcohol, respectively) or by brominating the ester, amide or ester-amide. The acids, esters, amides and amide-esters can be brominated in the same general way as the vegetable oils or animal fats can be brominated.

The BFAB FR additive is useful as a flame retardant additive in making extruded polymer foams from a combustible polymer. "Combustible" here simply means that the polymer is capable of being burned. Combustible polymers of interest include polyolefins such as polyethylene (including copolymers of ethylene such as ethylene-α-olefin copolymers), polypropylene and the like; polycarbonates and blends of polycarbonates such as blends of a polycarbonate with a polyester; polyamides; polyesters; epoxy resins; polyurethanes; and vinyl aromatic polymers (including vinyl aromatic homopolymers, vinyl aromatic copolymers, or blends of one or more vinyl aromatic homopolymers and/or vinyl aromatic copolymers), as well as other flammable polymers in which the BFAB FR additive can be dissolved or dispersed. A "vinyl aromatic" polymer is a polymer of an aromatic compound having a polymerizable ethylenically unsaturated group bonded directly to a carbon atom of an aromatic ring. Vinyl aromatic monomers include unsubstituted materials such as styrene, divinylbenzene and vinyl naphthalene, as well as compounds that are substituted on the ethylenically unsaturated group (such as, for example alpha-methylstyrene), and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, 4-methyl styrene, and mixtures thereof. Expanded polymers of any of these types are of interest.

A combustible polymer of interest is a polymer or copolymer of a vinyl aromatic monomer, such as a styrene polymer, or a styrene copolymer such as a styrene-acrylic acid copolymer, a styrene-acrylonitrile (SAN) copolymer, or a styrene-acrylonitrile-butadiene (ABS) resin. Polystyrene, styrene-acrylic acid and SAN resins are especially preferred. Another combustible polymer of interest is a random, block or graft copolymer of butadiene and at least one vinyl aromatic monomer. Still another combustible polymer of interest is polyphenylene oxide.

The expanded polymer foam of the invention is made in an extrusion process. In the extrusion process, a molten mixture containing the combustible polymer(s), the BFAB FR additive, blowing agent(s) and optionally other materials is formed under sufficient pressure to keep the molten mixture from expanding. The BFAB FR additive can be introduced into the molten mixture by pre-blending it with the polymer(s) prior to melting the polymer(s), separately forming a concentrated "masterbatch" of the BFAB FR additive and a portion of the polymer(s) and mixing that masterbatch with the remainder of the polymer(s) before or after melting them, or by introducing the BFAB FR additive as a liquid or molten material into the melted polymer. In the process, the molten mixture containing the combustible polymer and the BFAB FR additive commonly is brought to a temperature of at least 180° C., often at least 190° C. or at least 200° C. before the molten mixture is extruded. Typically, this occurs at a point in the extrusion process where the combustible polymer is being mixed with other materials, such as the blowing agent and/or the BFAB FR additive. Typically (but not necessarily), the molten mixture is subsequently cooled somewhat to a suitable extrusion temperature, and it then passed through a die to a region of lower pressure, such that the mixture simultaneously cools and expands to form a cellular, expanded polymer. The expanded polymer may be open-celled, closed-celled, or contain both open and closed cells. The preferred extruded, expanded polymer contains at least 70% closed cells. The expanded polymer may be a sheet material having a thickness of not more than ¼ inch (6 mm), or may be a plank material having a thickness of from ¼ inch to 12 inches (0.6 to 30 cm), preferably from 0.5 to 8 inches (1.2 to 20 cm). The preferred extruded, expanded polymer is a styrene polymer or copolymer, most preferably polystyrene, a styrene-acrylic acid copolymer, a styrene-acrylonitrile copolymer or a blend of two or more thereof.

A blowing agent is used to provide a gas which generates the cells and expands the molten mixture after it passes through the die. The blowing agent may be a physical (endothermic) or chemical (exothermic) type, or a combination of both. Physical blowing agents include carbon dioxide, nitrogen, air, water, argon, C2-C8 hydrocarbons such as the various cyclic and acyclic isomers of butane or pentane, alcohols such as ethanol, and various ethers, esters, ketones, hydrofluorocarbons, chlorofluorocarbons, hydrochlorofluorocarbons and the like. Chemical blowing agents include the so-called "azo" expanding agents, certain hydrazide, semi-carbazide, and nitroso compounds, sodium hydrogen carbonate, sodium carbonate, ammonium hydrogen carbonate and ammonium carbonate, as well as mixtures of one or more of these with citric acid. Another suitable type of expanding agent is encapsulated within a polymeric shell.

The amount of blowing agent that is used is sufficient to impart the desired density to the foam. The extruded polymer foam suitably has a foam density of from about 1 to about 30 pounds per cubic foot (pcf) (16-480 kg/m$^3$), especially from about 1.2 to about 10 pcf (19.2 to 160 kg/m$^3$) and most preferably from about 1.2 to about 4 pcf (19.2 to 64 kg/m$^3$).

Other materials may be present during the extrusion process and in the resulting extruded polymer foam. These include melt flow promoters, other FR agents, including hexabromocyclododecane, other halogenated FR agents, and/or non-halogenated FR agents, other FR synergists, IR attenuators, corrosion inhibitors, colorants, stabilizers, nucleating agents, preservatives, biocides, antioxidants, fillers, reinforcing agents and the like. These and other additives can be used if desired or necessary for the particular extruded foam product or process. It is preferred that tin compounds are substantially absent from the extrusion process and the resulting extruded foam. Surprisingly, excellent FR performance and thermal stability can be obtained in the absence of these tin compounds.

The melt flow promoters are materials that, under fire conditions, help reduce the molecular weight of an organic polymer and thus allow it to melt away from the flame front or other source of heat. The melt flow promoters also are believed to assist in the liberation of HBr from the BFAB FR additive under conditions of high temperature, and in that manner increase the effectiveness of the BFAB FR additive. Examples of melt flow promoters include 2,3-dimethyl-2,3-diphenylbutane, 2,2'-dimethyl-2,2'-azobutane; bis(alpha-phenylethyl)sulfone; 1,1'-diphenylbicyclohexyl; 2,2'-dichloro-2,2'-azobutane, 2,2'-dibromo-2,2'-azobutane, 2,2'-dimethyl-2,2'-azobutane-3,3',4,4'-tetracarboxylic acid, 1,1'-diphenylbicyclopentyl, 2,5-bis(tribromophenyl)-1,3,4-thiadiazole, 2-(bromophenyl-5-tribromophenyl-1,3,4-thiadiazole and poly-1,4-diisopropylbenzene. The presence of from 0.05 to 0.5 parts by weight of a melt flow promoter per 100 parts by weight of the combustible polymer further improves FR performance at a given bromine level, or allows an equivalent improvement in FR performance to be achieved at a somewhat lower bromine content, than if the melt flow promoter is not present.

Other FR synergists can be inorganic or organic substances. Inorganic FR synergists include metal oxides (e.g., iron oxide, tin oxide, zinc oxide, aluminum trioxide, alumina, antimony trioxide and antimony pentoxide, bismuth oxide, molybdenum trioxide, and tungsten trioxide), metal hydroxides (e.g. aluminum trihydrate, magnesium hydroxide), zinc borate, antimony silicates, zinc stannate, zinc hydroxystannate, ferrocene and mixtures thereof. The organic FR synergists include halogenated paraffin, phosphorous compounds and mixtures thereof. The FR synergists may be employed in an amount from 0 to about 6 parts by weight per 100 parts by weight of the polymer.

The BFAB FR additive is present in the extruded polymer foam in a flame retarding amount, which is an amount sufficient to improve the performance of the polymer foam in one or more standard fire tests compared to the performance of an otherwise similar extruded foam that does not contain an FR additive. The amount of the BFAB FR additive is conveniently expressed in terms of the bromine content of the polymer foam. Generally, enough of the BFAB FR additive of the invention is present so as to provide the polymer composition with at least 0.1 part by weight of bromine per 100 parts of combined weight of the combustible polymer and BFAB FR additive. Enough can be used to provide the polymer composition with at least 0.5 part by weight bromine, with at least 0.8 part by weight bromine, or at least 1.0 part by weight bromine, on the same basis. Enough of the BFAB FR additive can be used to provide the polymer composition with as much as 30 parts by weight bromine, with as much as 20 parts by weight bromine, as much as 10 parts by weight bromine, as much as 5 parts by weight bromine or as much as 3 parts by weight bromine, on the same basis.

Any one or more of several tests can be used to indicate an improvement in FR performance. Suitable standardized tests include a limiting oxygen index (LOI) measurement, in accordance with ASTM D2863; and various time-to-extinguish tests or flame spread tests such as that known as FP-7 (described further below) and the DIN 4102 part 1, NF-P 92/501/4/5, SIA 183 or EN ISO 11925-2 tests which are used in Germany, France, Switzerland and Europe, respectively.

Improvement is established in the LOI method if the limiting oxygen index of the extruded polymer foam is increased by at least 0.5 unit, preferably by at least 1.0 unit and more preferably at least 2 units, compared to an otherwise like foam which does not contain an FR additive. FR performance in the LOI test may be increased by as much as 8 units or more. An extruded styrene polymer or copolymer foam containing the BFAB FR additive of the invention may exhibit an LOI of at least 21%, preferably at least 22% and more preferably at least 24%. It has been found that the BFAB FR additive can impart very high LOI values to extruded polymer foams, especially extruded polystyrene or styrene copolymer foams, even when used in relatively small amounts. In many cases, the LOI of an extruded polystyrene foam is from 27% to as much as 33% when the BFAB FR additive is present in an amount such that the bromine content of the expanded polymer is from 0.5 to 2.5 parts by weight per 100 parts of combined weight of the combustible polymer and BFAB FR additive.

Another fire test is a time-to-extinguish measurement, known as FP-7, which is determined according to the method described by A. R. Ingram J. Appl. Poly. Sci. 1964, 8, 2485-2495. This test measures the time required for flames to become extinguished when a polymer sample is exposed to an igniting flame under specified conditions, and the ignition source is then removed. An improvement in performance in this test is indicated by a shorter time being required for the flames to become extinguished. The time required for extinguishment under this test, when the extruded polymer foam contains the BFAB FR additive, is preferably reduced by at least one second, more preferably by at least 3 seconds and even more preferably by at least 5 seconds, compared to when the extruded polymer foam does not contain an FR additive. A time to extinguishment on the FP-7 test is desirably less than 15 seconds, preferably less than 10 seconds and more preferably less than 5 seconds.

Improvement is indicated in other time-to-extinguishment or flame spread tests such as DIN 4102 part 1, NF-P 92/501/4/5, SIA 183 and EN ISO 11925-2 tests by a "pass" rating, or alternatively by a reduction in the flame height, flame extinction time and/or formation of burning droplets, as specified in the individual test methods, compared to a similar foam that does not contain an FR additive.

It has been found that in many instances the BFAB FR additive provides a markedly greater improvement in FR performance on one or more of the foregoing tests, at a given bromine content in the extruded foam, than does even hexabromocyclododecane, which is the industry standard material for extruded polystyrene foam. Often, the bromine content of the polymer can be reduced by as much as 50% with no loss of performance when the BFAB FR additive is substituted for hexabromocyclododecane, especially when a melt flow promoter is also present.

In addition to the surprisingly effective performance of the BFAB FR additive in imparting FR characteristics to extruded foam, the BFAB FR additive exhibits surprising stability during the extrusion process itself. Because the BFAB FR additive does not eliminate bromine or HBr to any significant extent at extrusion temperatures of at least 180° C., at least 190° C., at least 200° C., at least 220° C. or even 240° C. or more, the risks of injury to humans due to exposure to these decomposition products is minimized. It is especially surprising that the BFAB FR additive exhibits little or no hydrolysis during the extrusion process, even when water or carbon dioxide is present as a blowing agent. Damage to equipment is also reduced because these corrosive by-products are minimally generated, if at all, during the extrusion process. This allows processing equipment to be manufactured using relatively inexpensive materials of construction such as carbon steel, rather than specialized, highly corrosion-resistant steels. It is of course within the scope of the invention to incorporate a corrosion inhibitor into the molten mixture if desired to further protect against the possibility of equipment corrosion.

In some embodiments of the invention, the extruded foam contains one or more IR attenuators. IR attenuators are materials that block the passage of infrared radiation through the foam, and thus reduce the transfer of heat through the foam. The effect of these materials is usually manifested as a reduced thermal conductivity, compared to an otherwise like foam in which the IR attenuator is not present. IR attenuators are often particular solids such as aluminum oxide, titanium dioxide or, preferably, carbon black or graphite, which are dispersed throughout the polymer matrix. The particle sizes of these materials typically range from 10 nm (nanometer) to 100 microns. IR attenuators are often used in an amount of from about 0.5 to about 8 parts, preferably from 2 to 5 parts, by weight per 100 parts by weight of polymer in the extruded foam.

The use of IR attenuators in conventional foams has been related to reductions in cell size, increases in foam density and increases in the proportion of open cells. These effects are usually unwanted, particularly in making foams with larger cross-sectional areas, as they increase costs and worsen skin quality. It has been surprisingly found that these effects are reduced or even eliminated when the BFAB FR additive is present in the extruded foam.

The following examples are provided to illustrate the invention, but not to limit the scope thereof. All parts and percentages are by weight unless otherwise indicated.

EXAMPLES 1-7 AND COMPARATIVE SAMPLES C1 AND C2

Expanded polystyrene Examples 1-7 and Comparative Samples C1 and C2 are made using an apparatus having, in sequence, a 2 inch diameter single-screw extruder (set temperatures of extruder zone 1—125° C., zone 2—175° C., zone 3—200° C.), a gear pump set at 200° C., a separate mixer set at 200° C. (for all but Example 4 and Comparative Sample C2, in which zone 3 of the extruder, gear pump and a blowing agent mixer are all set at 220° C.), two flat plate coolers and one trim mixer set at 160° C., 135° C. and 120-123° C., respectively, an adapter block, and an adjustable slit die. Polystyrene is dry blended with an extrusion aid, stabilizer, cell size control agent, colorant, and the melt flow promoter (if any), and fed into the extruder at a total polystyrene feed rate of 60 kg/hour. Brominated sunflower oil (BSO) is fed into the process as the neat liquid, i.e., no compounding or diluting is performed prior to addition. The BSO is a commercially available brominated sunflower oil that contains about 36% by weight bromine. It is a mixture of mainly triglycerides, with some mono-, diglycerides as well as some free fatty acids, all containing various degrees of bromine substitution. The BSO in the storage hopper is kept at 50° C. by external electrical heating. The hopper itself is placed 2 meters above the foam line, so that the BSO is fed to the low pressure side of a piston pump at the hydrostatic pressure created. The high pressure side of the pump feeds into the blowing agent mixer of the foam line through a separate port that is used for the blowing agents. The temperature and pressure of the blowing agent mixer, into which the BSO is injected, are 200° C. (unless otherwise noted above) and about 150 bar (15 MPa), respectively. The feed rate of the BSO is controlled by the weight loss over time in the storage hopper. A blowing agent mixture of 4 parts of carbon dioxide and 0.8 parts of isobutane per 100 parts of polystyrene is injected into the polymer melt in the mixer to form a foamable gel. The foamable gel is cooled and extruded through the slit die into a region of lower pressure to form the foam structure. The pressure at the die is about 80-100 bars (8-10 MPa); the pressure drop between the inlet of the mixer and the die inlet is 50-80 bars (5-8 MPa). The foam is formed between two forming plates to shape a rectangular plank of about 25 mm thickness and about 140 mm width. The residence time in the foaming line is about 40 minutes. For each formulation, about 6 meters of foam are collected for property testing.

Physical properties and FR testing is conducted on each foam, with results as indicated in Table 1.

TABLE 1

| | Example or Comparative Sample No. | | | | | | | | |
|---|---|---|---|---|---|---|---|---|---|
| | 1 | 2 | 3 | 4 | 5 | 6 | 7 | C1* | C2* |
| FR Additive, pphr | | | | | | | | | |
| BSO | 2.5 | 4.0 | 4.0 | 4.0 | 5.5 | 5.5 | 7.0 | 0 | 0 |
| Melt flow promoter | 0.1 | 0 | 0.1 | 0.1 | 0 | 0.1 | 0 | 0 | 0.1 |
| HBCD | 0 | 0 | 0 | 0 | 0 | 0 | 0 | 2.5 | 2.5 |
| Foam Properties | | | | | | | | | |
| Wt % Br[1] | 0.9 | 1.4 | 1.4 | 1.4 | 2.0 | 2.0 | 2.5 | 1.9 | 1.9 |
| Cell size[2], mm | 0.26 | 0.21 | 0.25 | 0.21 | 0.27 | 0.24 | 0.24 | 0.21 | 0.21 |
| Compr. Str., EN-826[2,] kPa | 466 | 420 | 422 | 423 | 407 | 397 | 344 | 541 | 565 |
| Density[3], kg/m$^3$ | 35.5 | 35.3 | 34.7 | 34.2 | 34.7 | 35.0 | 35.0 | 37.7 | 36.2 |
| Thermal Conductivity, EN8301-01, at 10° C. after 30 days, mW/m-K | 33.9 | 32.3 | 33.9 | 34.3 | 32.8 | 32.8 | 32.5 | 33.1 | 34.0 |

TABLE 1-continued

| | Example or Comparative Sample No. | | | | | | | | |
|---|---|---|---|---|---|---|---|---|---|
| | 1 | 2 | 3 | 4 | 5 | 6 | 7 | C1* | C2* |
| Flame Testing | | | | | | | | | |
| DIN 4102[4], Pass/Fail | Pass | Pass | Pass | Pass | Pass | Pass | Pass | Pass | Pass |
| NF-P 92/501/4/5[5] pass/fail | Pass | Fail | Pass | Pass | Fail | Pass | Pass | Fail | Pass |
| SIA 183[6], pass/fail | Pass | Pass | Pass | Pass | Pass | Pass | Pass | Pass | Pass |
| LOI, % $O_2$ | 29.5 | 30.5 | 32.0 | 32.5 | 31.5 | 32.5 | 32.0 | 29.5 | 29.5 |

Pphr means "parts per 100 parts by weight resin".
[1]Bromine content as weight percent of expanded polymer. The BSO or HCBD is the only source of bromine in these experiments.
[2]Vertical direction.
[3]ISO 845-95.
[4]A "pass" rating requires a flaming height of less than 15 cm for all test specimens and no ignition of paper below the sample by burning polymer droplets.
[5]A "pass" rating requires an average flame extinction time of less than 2 seconds with no more than 10% of the samples having a flame extinction time of more than 2 seconds, plus no burning droplets.
[6]A "pass" rating requires flame height to be below 15 cm and flame extinction time to be below 15 seconds.

The data indicated in Table 1 shows that the brominated sunflower oil is an effective FR additive. As shown by Examples 1-7, the brominated sunflower oil (in some cases in conjunction with a small quantity of melt flow promoter), provides equivalent FR properties, as measured by the indicated tests, even at significantly lower bromine contents (Examples 1-4), than does hexabromocyclododecane. The brominated sunflower oil has essentially no effect on foam processing and a positive effect on the cell size, thermal conductivity and density of the foams.

EXAMPLES 8-10 AND COMPARATIVE SAMPLE C3

A blend of 2% by weight powdered organotin carboxylate stabilizer and 98% hexabromostearic acid is prepared and charged to a powder feeder of a twin screw extruder. A polystyrene resin is melted in the extruder, combined with the stabilizer/hexabromostearic acid blend, and extruded into strands. The strands are cooled in a water bath and cut into masterbatch pellets approximately 5 mm in length.

Expanded polystyrene is prepared on an apparatus having, in sequence, a 25 mm single screw extruder with three heating zones, a foaming agent mixing section, a cooler section and an adjustable 1.5 mm adjustable slit die. The three heating zones are operated at set point temperatures of 115° C., 150° C. and 180° C. and the mixing zone operates at a set point temperature of 200° C. The masterbatch pellets are dry blended with additional polystyrene pellets and 0.05 wt %, based on dry blend weight, of processing aid. The ratio of masterbatch pellets and additional polystyrene pellets are such that the resulting foam contains 2.5 or 5.0 wt-% of hexabromostearic acid. The dry blend is fed to the extruder at a rate of 2.3 kilograms per hour. In one instance (Ex. 10), 0.5 part of melt flow promoter per 100 parts by weight polystyrene is also added during the extrusion process.

Carbon dioxide is fed into the foaming agent mixing section of the extruder using a RUSKA (Chandler Engineering Co.) syringe pump. 4.5 parts by weight of carbon dioxide are fed per 100 parts by weight of the dry blend. Pressure in the mixing section is maintained above 1500 psi (10.4 MPa) to provide a uniformly mixed polymer gel. The polymer gel is cooled to 120° C. to 130° C. and extruded through the die. The die opening is adjusted to maintain a die back pressure of at least 1000 psi (6.9 MPa). The foamable gel expands and solidifies to form foam as it exits the die.

For comparison, a foam is made in the same manner, substituting 2.5 pphr of hexabromocyclododecane for the hexabromostearic acid. That sample is designated as C3.

The foams are evaluated for density, LOI and for FR performance according to the FP-7 test described before. Results are as indicated in Table 2.

TABLE 2

| Ex. or Comp. Sample No. | C3* | 8 | 9 | 10 |
|---|---|---|---|---|
| HBCD[1], pphr | 2.5 | 0 | 0 | 0 |
| HBST[2], pphr | 0 | 2.5 | 5 | 2.5 |
| % Bromine | 1.9 | 1.5 | 3.0 | 1.5 |
| Melt flow promoter, pphr | 0 | 0 | 0 | 0.5 |
| FP-7[3], seconds | 0 | 1.0 | 0.2 | 0.2 |
| FP-7[3], no. of drips | 0 | 2 | 0 | 1 |
| LOI, % | 30.5 | 29.3 | 29.8 | 29.5 |
| Foam Density, kg/m³ | 41.6 | 39.1 | 55.3 | 52.9 |

*Not an example of the invention.
"Pphr" is parts per 100 parts resin.
[1]Hexabromocyclododecane.
[2]Hexabromostearic acid.
[3]Average time to flame extinction and number of burning drips that form according to the FP-7 test.

EXAMPLES 11-13 AND COMPARATIVE SAMPLE C4

Following the general procedure described with respect to Examples 1-7, an extruded polystyrene foam is made using 2.5 parts by weight of the BSO per hundred parts by weight polystyrene, and a blowing agent mixture containing 3 parts carbon dioxide, 1.5 parts isobutane and 0.6 parts water, all per hundred parts by weight polystyrene. This foam is designated as Example 11. Its bromine content is 1.1 percent by weight.

Another foam is made in the same manner as Example 11, except that 4 pphr by weight of a 250 nm-particle size carbon black is incorporated into the foam by dry blending it with the polystyrene prior to the melting step. The resulting foam is designated as Example 12, and contains 1.2 weight percent bromine.

Example 11 is again repeated, this time adding 2 pphr of graphite into the foam process instead of the carbon black and reducing the amount of brominated sunflower oil slightly. The resulting foam is designated as Example 13, and contains 0.8 weight percent bromine.

Another foam is made in the same manner as Example 11, except hexabromocyclododecane is substituted for the brominated sunflower oil. The bromine content of the product foam is 1.7%. This foam is designated Comparative Sample C4.

Foam density, cell size, DIN 4102 testing and EN ISO 11925-2 "Class E" testing are conducted on each of foam Examples 11-13 and Comparative Sample C4. Results are as indicated in Table 3.

TABLE 3

| | Example or Comparative Sample No. | | | |
|---|---|---|---|---|
| | 11 | 12 | 13 | C4* |
| FR Additive, pphr | | | | |
| BSO | 2.5 | 2.5 | 2.3 | 0 |
| HBCD | 0 | 0 | 0 | 2.5 |
| IR attenuator, type | 0 | 4, Carbon black | 2, graphite | 0 |
| Foam Properties | | | | |
| Wt % Br[1] | 1.1 | 1.2 | 0.8 | 1.7 |
| Cell size[2], mm | 0.40 | 0.42 | 0.23 | 0.48 |
| Density[3], kg/m$^3$ | 32.8 | 30.8 | 35.1 | 34.0 |
| Thermal Conductivity, EN8301-01, at 10° C. after 30 days, mW/m-K | 33.9 | 31.7 | 29.4 | 33.7 |
| Flame Testing | | | | |
| DIN 4102[4], Pass/Fail | Pass | Pass | Fail | Pass |
| EN ISO 11925-2 Class E[5], Pass/Fail | Pass | Pass | Pass | Pass |
| LOI, % O$_2$ | 27.0 | — | — | 28.0 |

Pphr means "parts per 100 parts by weight resin".
[1]Bromine content as weight percent of expanded polymer. The BSO or HCBD is the only source of bromine in these experiments.
[2]Vertical direction.
[3]ISO 845-95.
[4]A "pass" rating requires a flaming height of less than 15 cm for all test specimens and no ignition of paper below the sample by burning polymer droplets.
[5]A "pass" rating requires flame height to be below 15 cm for all test specimens and no ignition of paper below the sample by burning polymer droplets.

Example 11 exhibits fire performance equivalent to that of Comparative Sample C4, even though Example 11 contains only about two-thirds the amount of bromine as does Comparative Sample C4. Foam density is significantly lower for Example 11, and cell size is somewhat smaller as well. Example 12 demonstrates the effect of adding 4 pphr of carbon black. Fire performance is essentially unaffected, whereas density is reduced and cell size is increased slightly. The lower density and slight enlargement in cell size are beneficial and unexpected. Example 13 demonstrates the effect of adding 2 pphr of graphite. Some loss in fire performance is seen due to the reduced bromine content of the foam. However, Example 13 still passes the EN ISO 11925-2 fire test, even though it contains no melt flow promoter. BSO has been found to be stable under these extrusion conditions. No significant loss of molecular weight or hydrolysis products are seen when water is present as a blowing agent in the extrusion process. Both Examples 12 and 13 show improved thermal insulation properties over Example 11.

What is claimed is:

1. An extruded combustible polymer foam containing a flame retarding amount of a brominated fatty acid, an ester, amide or ester-amide of a brominated fatty acid, a glyceride of one or more brominated fatty acids, a polymerized brominated fatty acid, or a mixture of any two or more of the foregoing, and a melt flow promoter, wherein said combustible polymer is polystyrene, a styrene-acrylic acid copolymer, or a styrene-acrylonitrile copolymer or a mixture of two or more thereof.

2. The extruded combustible polymer foam of claim 1 which has a density of from 1 to 30 lb/ft$^3$ (16-480 kg/m$^3$).

3. The extruded combustible polymer foam of claim 1 wherein the brominated fatty acid, an ester, amide or ester-amide of a brominated fatty acid, a glyceride of one or more brominated fatty acids, a polymerized brominated fatty acid, or a mixture of any two or more thereof is present in an amount sufficient to provide from 0.5 to 10 parts of bromine per 100 parts of combined weight of the combustible polymer and the brominated fatty acid, an ester, amide or ester-amide of a brominated fatty acid, a glyceride of one or more brominated fatty acids, a polymerized brominated fatty acid, or a mixture of any two or more thereof.

4. The extruded combustible polymer foam of claim 3, further comprising an IR attenuator.

5. The extruded combustible polymer foam of claim 4 wherein the IR attenuator is carbon, graphite or a mixture thereof.

6. The extruded combustible polymer foam of claim 3, wherein the melt flow promoter includes 2,3-dimethyl-2,3-diphenylbutane or 1,4-diisopropyl benzene.

7. An extruded combustible polymer molded article, the extruded combustible polymer molded article containing a flame retarding amount of a brominated fatty acid, an ester, amide or ester-amide of a brominated fatty acid, or a glyceride of one or more brominated fatty acids, a polymerized brominated fatty acid, or a mixture of any two or more of the foregoing, wherein said combustible polymer is polystyrene, a styrene-acrylic acid copolymer, or a styrene-acrylonitrile copolymer or a mixture of two or more thereof.

* * * * *